United States Patent
Horn et al.

(10) Patent No.: US 6,305,833 B1
(45) Date of Patent: Oct. 23, 2001

(54) PRODUCTION OF SOLIDS BY PRECIPITATION

(75) Inventors: Hans Christoph Horn, Lambsheim; Otto Kumberger, Mannheim; Marco Millies, Ludwigshafen; Norbert Neth, Bobenheim-Roxheim; Wolfgang Jürgen Pöpel, Darmstadt; Christopher William Rieker, Hassloch; Michael Jolyon Sprague, Mannheim; Manfred Stroezel, Ilvesheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/143,405

(22) Filed: Aug. 28, 1998

(30) Foreign Application Priority Data

Sep. 1, 1997 (DE) ............................. 197 38 085

(51) Int. Cl.⁷ ....................................... B01F 15/02
(52) U.S. Cl. .............................................. 366/136
(58) Field of Search ........................... 366/136, 137, 366/139, 162.1, 160.1

(56) References Cited

U.S. PATENT DOCUMENTS

| | | | |
|---|---|---|---|
| 3,421,477 | * 1/1969 | Gilbert et al. | 366/177 |
| 3,895,065 | 7/1975 | Alheritiere et al. | |
| 3,897,935 | * 8/1975 | Forster et al. | |
| 3,900,417 | * 8/1975 | Marks . | |
| 4,325,642 | * 4/1982 | Kratky et al. | 366/177 |
| 4,495,087 | 1/1985 | Ng et al. | |
| 4,568,196 | * 2/1986 | Hacheney . | |
| 4,915,509 | 4/1990 | Sauer et al. | 366/171 |
| 5,181,987 | * 1/1993 | Breuker et al. | |
| 5,599,964 | 2/1997 | Roberg et al. | |
| 5,921,679 | * 7/1999 | Muzzio et al. | |
| 5,931,579 | 8/1999 | Gallus et al. | 366/163 |

FOREIGN PATENT DOCUMENTS

| 42 20 239 | 12/1993 | (DE) . |
|---|---|---|
| 655 984 | 12/1996 | (EP) . |

OTHER PUBLICATIONS

Precipitation, Soehnel, Butterworth, Chapter 7, pp. 269–272.

* cited by examiner

Primary Examiner—Tony G. Soohoo
(74) Attorney, Agent, or Firm—Keil & Weinkauf

(57) ABSTRACT

A process for producing solids by precipitation in a mixer to form a mixture of solid and liquid, where the starting materials are fed into a mixing apparatus which has essentially a rotationally symmetrical mixing chamber which has a rotor disposed therein and is formed by a peripheral wall and two end walls, and where a) the starting materials are each fed to at least one inlet opening in the peripheral wall of the mixing chamber, and b) the solid-containing mixture which is formed is removed from at least one outlet opening in the peripheral wall of the mixing chamber.

8 Claims, 1 Drawing Sheet

PRODUCTION OF SOLIDS BY PRECIPITATION

BACKGROUND OF THE INVENTION

The present invention relates to an improved process for producing solids by precipitation in a mixer to form a mixture of solid and liquid.

Various apparatuses and processes for producing solids by precipitation are known. Reactions of this type are frequently carried out in stirred vessels. Such processes are described in detail, for example, in O. Soehnel, J. Garside: Precipitation; Butterworth Heinemann, Oxford, 1992. Besides the complexity and cost of operating such processes, the relatively long residence times also prove to be disadvantageous. Furthermore, the existing possibilities for controlling such processes are inadequate.

EP-B 0 655 984 describes a process for producing solids by mixing two liquids, these liquids being fed together under high pressure into a decompression apparatus.

The decompression in mixing chambers of various designs dissipates the power introduced with the pressure and uses it for mixing. However, in this case high local temperature peaks occur and may result in damage to the product or formation of unwanted phases. Furthermore, signs of cavitation may occur in this elaborate high-pressure process and cause further damage to the product.

BRIEF SUMMARY OF THE INVENTION

It is an object of the present invention to find an improved process for producing solids by precipitation in a mixer to form a mixture of solid and liquid, which remedies said disadvantages and makes possible to produce solids of high quality in a simple and economic process. It is further intended that the novel process parameters and, in the event of fluctuations which may occur, for example, when the starting materials are changed, can be adjusted easily and rapidly.

We have found that this object is achieved by a process for producing solids by precipitation in a mixer to form a mixture of solid and liquid, which comprises feeding the starting materials into a mixing apparatus which has essentially a rotationally symmetrical mixing chamber which has a rotor disposed therein and is formed by a peripheral wall and two end walls, and where a) the starting materials are each fed to at least one inlet opening in the peripheral wall of the mixing chamber, and b) the solid-containing mixture which is formed is removed from at least one outlet opening in the peripheral wall of the mixing chamber.

DETAILED DESCRIPTION OF THE INVENTION

The design of mixing apparatuses suitable for the novel process is described in DE-C 4 220 239. These apparatuses combine the properties of a pump, of a mixer and of a reactor. An apparatus of this type essentially consists of a multipart housing in which a rotationally symmetrical mixing chamber is formed. This mixing chamber is bounded by a cylindrical insert element having an end wall and a peripheral wall, and a bearing support having an end wall. Inlet openings for the components to be mixed, and an outlet opening for the component mixture, are provided in the peripheral wall and in the appropriate housing part. The rotating part preferably consists of a disk with indentations. The solutions can be fed in at the same angle to the circumference or at various angular positions of the mixer. To date, apparatuses of this type have been employed merely for mixing and/or reacting liquid starting materials when the reaction might result in evolution of gas. The use of such apparatuses in processes in which relatively extensive solid formation is to be expected would not have been considered by the skilled worker because blockage of the mixing apparatus was to be feared in this case. However, surprisingly, these apparatuses can also be employed for reactions to produce solids. The process can preferably also be employed when the starting materials themselves have a certain solid content. The solids contents of the starting material streams in this case are normally about 0.01 to 20, preferably, 1 to 7% by weight.

The novel process provides reliable control and adjustability of technical parameters important for the precipitation reaction, such as the temperature and pH, and thus makes it possible to produce solids with defined pore size and particle size. It is also possible to influence the phase, i.e. the structure of the solid produced, by the novel process.

The process makes short mixing and residence times possible, and they are normally about 1 ms to 2 s, preferably 5 ms to 10 ms. It is possible to produce various solids, and it is generally suitable for hydroxides, carbonates, hydroxycarbonates, oxides and mixed oxides of one or more elements, zeolites and other materials of low solubility, particularly preferably for carbonates, hydroxycarbonates and hydroxides as are used as precursors for catalysts and catalyst carriers. The pressures in the novel process are about 1 to 10 bar, preferably 1 to 1.5 bar.

Figure 1:
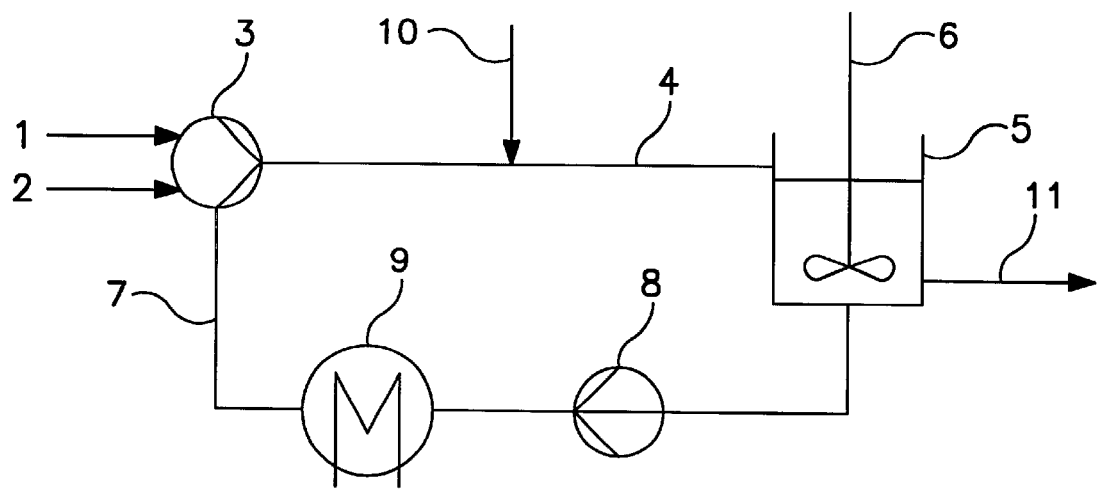
FIG. 1 depicts a preferred arrangement of the mixing apparatus and other process units for carrying out the invention.
Figure 2:
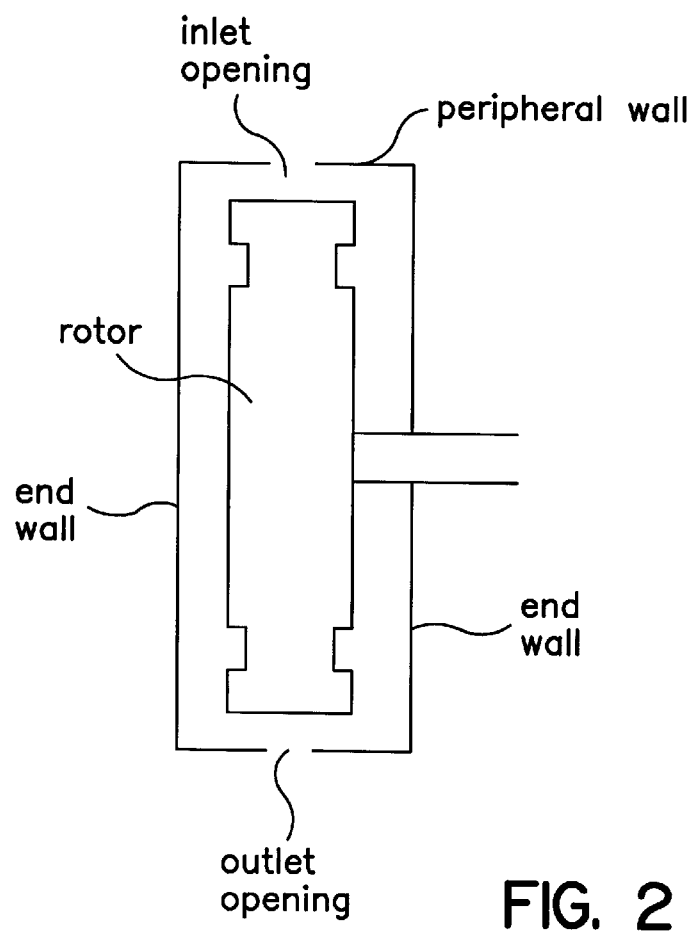
FIG. 2 shows the mixing chamber of the invention.

The novel process is described in detail in a preferred embodiment with reference to FIG. 1.

The starting materials are fed into the mixing apparatus (3) through lines (1) and (2). This mixing apparatus is a peripheral pump with a mixing volume of 3.85 ml operating at 2900 rpm.

The starting materials are fed in so that the slurry is placed centrally on the impeller, whereas the sodium carbonate and metal salt solution are added laterally.

The precipitation reaction takes place in the mixing apparatus. The mixture obtained in this way is fed through line (4) into a degassing tank (5) provided with a stirrer (6). The residence time in the degassing tank is about 1 to 100 s, with the stirrer rotating at about 50 to 500 rpm. Depending on the substance system employed, considerable amounts of gas are produced, and it is advisable to remove this gas before recycling a part-stream in order to avoid adverse effects on circulation. In the particular case of precipitations with carbonates, the content of gaseous $CO_2$ may be up to 90% by volume, and it is possible to adjust the system pressure so that the required concentration of dissolved $CO_2$ is attained.

A part-stream of the product obtained in this way is advantageously returned through line (7) and pump (8) to the mixing apparatus (3). The recycled stream should amount to about 50 to 98%, preferably 94 to 96%, of the total volumetric flow through the mixture. The recycling is advantageous in particularly effectively preventing deposition of solid in the mixing apparatus. The supersaturation can be adjusted as required in this way. The temperature in the mixer can be adjusted to the required value by means of a heat exchanger (9), which is preferably disposed in the return line (7). In general, the temperatures in the mixer are about 25 to 70° C. The remainder of the product is taken off through line (11). Dilution of the resulting product may also be advisable for the degassing. This considerably speeds up coalescence, for example in the case of suspensions, and subsequently the gas is easily removed from the suspension.

Other starting materials such as water can be added through line (10). This may be advisable, for example, in order to suppress nucleation and thus obtain definitely larger particles.

The pH can be adjusted, for example, by metering in nitric acid or sodium carbonate.

The novel process provides a simple and economic production of solids by precipitation. Because the adjustability of important process parameters such as temperature and pH is good, it is possible advantageously to produce a product of high quality with defined pore size, particle size and, where appropriate, also phase (structure).

EXAMPLE

Experiments on the precipitation of metal ions by sodium carbonate solutions were carried out. A mixer supplied by K Engineering, 58566 Kierspe, Germany, with a chamber volume of 3.85 ml operating at 2900 rpm was used for this. The volumetric flows of metal salt solution, sodium carbonate solution and recycled suspension are listed in the following table. A wide rage of parameters was covered. Stable precipitation conditions were achievable in the stated range of parameters. The recycled volumetric flow, the metal salt solution and the sodium carbonate solution were fed separately but at the same angle to the circumference into the mixer. The outlet from the mixer was displaced by 270° in the direction of rotation from the inlet. The recycled volumetric flow was 12 to 46 times the total of the volumetric flows of metal salt, sodium carbonate and wash solutions.

TABLE

| Precipitations in the mixer - data on precipitated products | | |
|---|---|---|
| MSS + $Na_2CO_3$ + wash 1/h | Circulation 1/h | Circulation/ (MSS + $Na_2CO_3$ + wash) ratio 1/1 |
| 3 | 35 | 12 |
| 5.07 | 70 | 14 |
| 3.5 | 70 | 20 |
| 3.39 | 70 | 21 |
| 2.76 | 70 | 25 |
| 1.77 | 70 | 40 |
| 3.26 | 150 | 46 |

We claim:
1. A process for producing solids by precipitation which comprises feeding starting materials into a rotationally symmetrical mixing chamber which has a rotor disposed therein and is formed by a peripheral wall and two end walls, and where
   a) the starting materials are each fed to at least one inlet opening in the peripheral wall of the mixing chamber,
   b) precipitation occurs in the mixing chamber and
   c) a mixture of solid and liquid which is formed in the mixing chamber is removed from at least one outlet opening in the peripheral wall of the mixing chamber.
2. The process of claim 1, wherein part of the mixture of solid and liquid which is formed is returned to the mixing chamber.
3. The process of claim 2, wherein the mixture of solid and liquid which is formed is degassed before recycling a part-stream of the mixture of solid and liquid.
4. The process of claim 2, wherein the part of the mixture returned to the mixing chamber amounts to 50 to 98% of the total volumetric flow through the mixing chamber.
5. The process of claim 1, wherein the rotor operates at 2900 rpm.
6. The process of claim 1, wherein the rotor operates at greater than 2900 rpm.
7. The process of claim 1, wherein the mixture in the mixing chamber has turbulent flow.
8. The process of claim 1, wherein the residence time in the mixing chamber is about 1 ms to 2 s.

* * * * *